United States Patent [19]

Johnson

[11] 4,261,279
[45] Apr. 14, 1981

[54] FENDER FOR FLOATING VESSEL

[76] Inventor: Leonard W. Johnson, 483 Main St., Amesbury, Mass. 01913

[21] Appl. No.: 914,344

[22] Filed: Jun. 12, 1978

[51] Int. Cl.³ .................................................. B63B 59/02
[52] U.S. Cl. ..................................... 114/220; 114/230
[58] Field of Search ............... 114/230, 213, 219, 220, 114/263; 267/153; 403/220, 291; 405/212, 213, 214

[56] References Cited

U.S. PATENT DOCUMENTS

| | | | |
|---|---|---|---|
| 2,842,939 | 7/1958 | D'Auriac | 61/48 |
| 3,084,517 | 4/1963 | Bell | 114/230 |
| 3,088,287 | 5/1963 | Berry | 114/263 X |
| 3,196,824 | 7/1965 | Howard | 114/230 |
| 3,307,514 | 3/1967 | Young | 114/230 |
| 3,463,114 | 8/1969 | Lovell | 114/230 |
| 3,493,991 | 2/1970 | De Bianchi | 403/291 X |
| 3,585,959 | 6/1971 | Cook | 114/220 |
| 3,863,591 | 2/1975 | Wild | 114/230 |
| 3,981,261 | 9/1976 | Kauffman et al. | 114/230 |

FOREIGN PATENT DOCUMENTS 1580863  9/1969  France ..................... 114/230

Primary Examiner—Sherman D. Basinger
Attorney, Agent, or Firm—Bruce D. Sunstein

[57] ABSTRACT

A fender maintains separation between a vessel, such as a pleasure boat, and a wharf to which the vessel is moored. The fender utilizes a thrust rod, one end of which is connected to the vessel. In a preferred embodiment, the other end of the thrust rod is linked to one end of each of two elastic shock absorber elements. The other ends of each of such shock absorber elements are capable of being affixed to the wharf. The embodiment also provides wheels at the wharf end of the thrust rod to reduce friction between the thrust rod end and the wharf.

15 Claims, 4 Drawing Figures

FENDER FOR FLOATING VESSEL

BACKGROUND OF THE INVENTION

This invention pertains to fenders for vessels, that is, devices of the type used in connection with mooring a floating vessel to a wharf, wherein the device is capable of dissipating energy or otherwise responding so as to protect vessel and wharf from damage caused by motion of one relative to the other.

A vessel, and especially a pleasure boat, is apt to be moored at a wharf unattended for days and weeks at a time. Pleasure boats commonly range in a length from 15 feet (4.6 m) to 50 feet (15.2 m), but there are a considerable number of pleasure boats having lengths outside this range. If the wharf is located on a narrow fairway subject to the action of the winds, the hull of a boat so moored, as well as the wharf to which it is moored, is subject to damage from the continual pitching and rolling of the boat and from its bumping and rubbing against the wharf caused by the wakes of passing boats and the natural winds and waves.

A conventional method of protection from such damage to hull and finish, especially for smaller boats, is the use of cushioning bumpers of various sorts, such as braided rope or, more commonly, pneumatic bumpers, available in various shapes, hung between boat and wharf. For ships and other large vessels there are other cushioning devices which can be attached at points along a wharf.

Another method of protection is to line the edge of the wharf with cushioning material such as old fire hose, or with rubber or plastic lineal extrusions made for the purpose.

Another protective method is to tie the boat away from the wharf to an opposite wharf or piling set away from the wharf.

Another protective method employs flexible glass fiber poles or whips, the butt ends of which are held in special holders on the wharf and the tip ends of which are bent and tied to the boat with ropes in such a way as to fend it away from the wharf.

All of the above approaches leave much to be desired for a variety of reasons. Some of these reasons are discussed below.

Bumpers hung from the boat or wharf do not operate over a wide enough gap between boat and wharf. They only exert a fending force when they are actually being compressed between the boat and the wharf and, because the distance over which the bumper can be compressed is comparatively small (a very few inches at best), the fending forces exerted on the hull and wharf are comparatively very large and damaging to the hull. Further, when boat-mounted bumpers are not under compression, they continually swing back and forth against the hull, from the pitching and rolling of the boat, and eventually this action chafes and mars the hull. Ship bumpers installed at points along a wharf also exert concentrated large forces which might be harmful.

Linear cushioning means lining the edge of the wharf also exert strong forces against the hull and eventually chafe and mar it.

The opportunity for tying off to other wharfs or pilings is not always available, and, when it is, the process of tying off is an awkward maneuver to accomplish.

Whips made of glass fiber are expensive, ineffective against strong forces, and non-stowable aboard.

There is disclosed in U.S. Pat. No. 2,842,939, issued for an invention of P. A. D'Auriac, a shock absorber for docking of ships. This shock absorber in its preferred embodiment comprises a pair of shoes for contacting the hull of a ship and a rather complex carriage structure for supporting the shoes resiliently away from the dock side. The carriage moves on a vertical track on the dock side. The shock absorber therefore cannot be used unless the dock has available a side on which the carriage may be mounted. In many instances, such a side may not be available, or if available, the use thereof may be inconvenient. Furthermore, the carriage structure may be undesirably expensive and cumbersome, particularly in connection with the mooring of pleasure boats.

SUMMARY OF THE INVENTION

It is an object of the present invention to provide a boat fender that does not rub against the hull of the vessel in connection with which it is employed. It is a further object of the present invention to provide a boat fender having superior fending characteristics, including the following: (i) application of a fending force from any distance of a wide range of distances between vessel and wharf and (ii) application of a fending force that increases inversely in smooth relation to the distance between vessel and wharf.

It is a further object of the invention to provide a boat fender having a fending force range that is capable of some adjustment in connection with the installation thereof.

It is also an object of the invention to provide an economical and practical boat fender.

It is also an object of the invention to provide a boat fender capable of being designed for any desired range of fending force, such range being one of a large field of possible ranges.

Another object is to provide a boat fender that is compact and capable of being stowed aboard a small vessel.

Another object is to provide a boat fender, employing one or more shock absorber elements, in such a way that the fending force thereof can be increased by adding additional shock absorber elements.

These and other objects of the invention are achieved by providing a thrust rod having two ends, hereinafter called a "wharf end" and a "vessel end"; and a means for connecting the vessel end of the thrust rod to the hull of the vessel. In a preferred embodiment of the invention, the wharf end of the thrust rod is linked to one end of each of two elastic shock absorber elements; the other ends of such shock absorber elements are capable of being affixed to the wharf. This preferred embodiment also includes a pair of wheels at the wharf end of the thrust rod to reduce friction between this thrust rod end and the wharf.

BRIEF DESCRIPTION OF DRAWINGS

These and other objects and features of the invention are more readily understood by the consideration of the following detailed description taken with the accompanying drawings, in which.

DESCRIPTION OF SPECIFIC EMBODIMENTS

Figure 1:
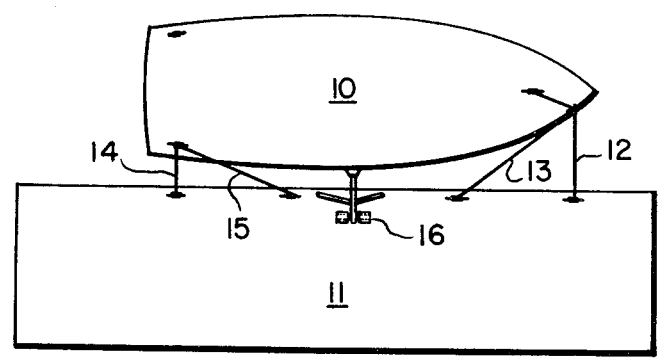
FIG. 1 is a schematic plan view representing a vessel moored to a wharf by means of docking lines, and being held away from the wharf by means of an embodiment of my invention.

Referring now to the particular embodiments of the invention shown in the drawings by way of example only, FIG. 1 shows vessel 10 moored to wharf 11, preferably a floating wharf or one where the water level is quite constant in relation to the top surface of the wharf, by means of bow docking line 12, bow spring line 13, stern docking line 14, and stern spring line 15. The vessel 10 is being fended away from wharf 11 by means of the boat fender assembly 16 in accordance with this invention.

Figure 2:
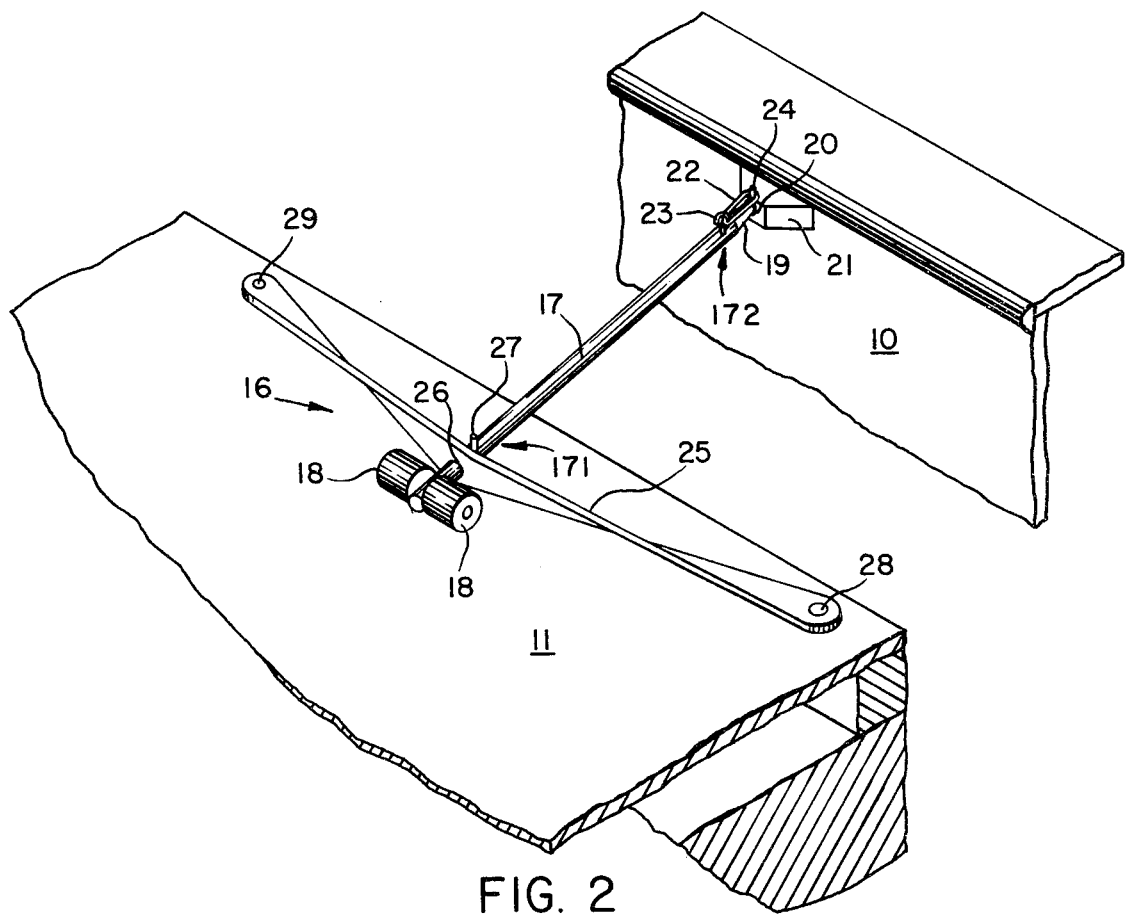
FIG. 2 is an isometric view of a preferred embodiment of the invention showing a thrust rod, a dual-element elastic shock absorber that has been made from a single elastic piece, wheels, a hull fitting, and an elastic retaining bail.

The boat fender assembly 16 of FIG. 1 is shown in further detail in FIG. 2, where the assembly 16 is shown to comprise a thrust rod 17, which is a stiff elongated rod; wheels 18 are mounted near the wharf end 171 of the thrust rod 17 so as to permit that end to roll upon the wharf 11. The vessel end 172 of the thrust rod 17 is shaped into a rounded point 19 so as to fit into socket 20 of hull fitting 21. The hull fitting 21 is mounted on the hull 10 of the vessel. The point 19 of thrust rod 17 is held into the socket 20 by means of the elastic retaining loop 22 tied to screw eye 23 on the thrust rod 17 and looping around hook 24 on the hull fitting 21.

Still in reference to FIG. 2, the fender assembly has a dual-element elastic lateral shock absorber 25 that is attached to the thrust rod 17 through hole 26; motion of the shock absorber relative to the thrust rod 17 is restricted by wheels 18 and transverse pin 27. The end of each element of the lateral shock absorber 25 is attached to the wharf 11 by means of fastening post 28 protruding through a hole in the end of one element and fastening post 29 protruding through a hole in the end of the other element of the shock absorber. If desired, the posts 28 and 29 may be capped or notched to assist in preventing the shock absorber from becoming dislodged therefrom.

When waves strike the boat, causing it to pitch and roll and to move toward the wharf, the forces and motions are transmitted via the hull fitting 21 and thrust rod 17 to the shock absorber 25 where they are absorbed, dampened, and restoratively opposed so as to push gently but firmly the boat back away from the wharf to its original position against the docking lines.

Whereas conventional bumpers or other cushioning devices must absorb such forces and motions almost instantaneously within the small squeezed distance of the bumper and with a large resultant force of impact and commensurate wear and damage to the hull, my invention acts from the very beginning of movement of the vessel toward the wharf and gradually absorbs the same forces and motions over a much larger distance, as much, for example, as one or two feet (30 or 60 cm). As a result, my invention pushes the vessel away from the wharf, back against the vessel's docking lines, and without the vessel's touching the wharf or suffering undue stresses or damage; the fending action of my invention is generally gentle, steady, and quiet.

The range of fending force provided by my invention can be adjusted, at the time of installation, by varying the distance between the fastening posts 28 and 29. Thus (within limits dictated by a given design employing my invention) as the distance between the fastening posts is increased, the range of fending force also increases, since the elastic shock absorber elements are thereby put under greater tension. Accordingly, at the time of installation, a distance between the fastening posts can be chosen so as to optimize the fending performance. Of course, the fending force is also a function of other factors, including the material chosen for the shock absorber, its dimensions and elasticity, as well as thrust rod length and the extent to which docking lines and the like permit the vessel to move away from the wharf.

Figure 3:
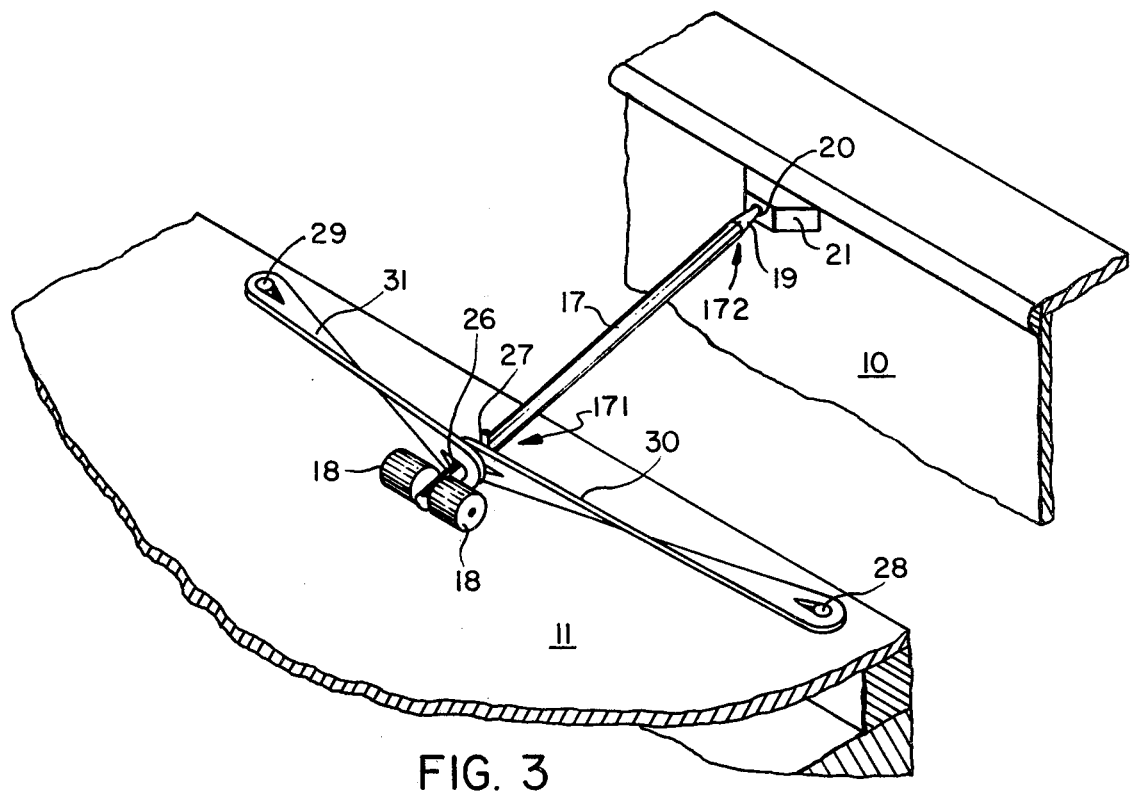
FIG. 3 is an isometric view of another preferred embodiment of the invention, similar to that shown in FIG. 2, except with a dual-element shock absorber made in two pieces from two conventional rubber snubbers.

The embodiment of FIG. 3 is similar to that of FIG. 2 except that the shock absorber is comprised of two conventional rubber snubbers 30 and 31 which are currently on the market. The shock absorber elements need not be made of rubber, however, and could, for example, employ coiled springs or other elastic materials that are extensible and self-restoring. The elastic bail 22 of FIG. 2 as well as the screw eye 23 and hook 24 of FIG. 2 have been omitted for sake of simplicity, but is is understood that such items or equivalents thereof are preferred in this embodiment.

Figure 4:
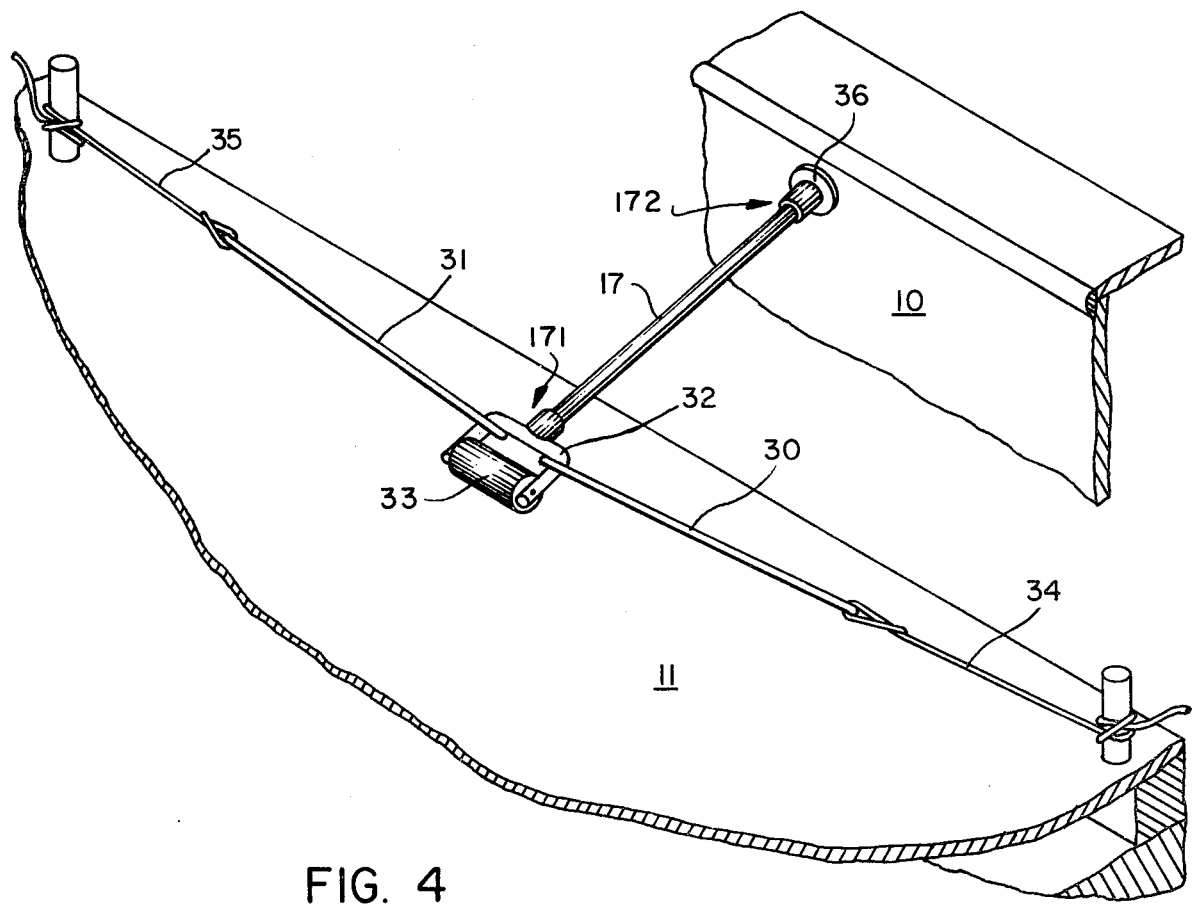
FIG. 4 is an isometric view of a third preferred embodiment of the invention, similar to that shown in FIG. 2 except with a two-piece dual-element shock absorber, a yoke for attaching the shock absorber elements and for mounting a roller, and a rubber suction cup hull attachment.

The embodiment of FIG. 4 is also similar to that of FIG. 2 except that it has a yoke 32, the stem of which is mounted on the wharf end of the thrust rod 17. If desired, the stem can be made so that the thrust rod can be readily removed from the yoke. Mounted between arms of the yoke 32 is a single roller 33; also attached to each arm of the yoke is one end of the snubbers 30 and 31. The other ends of the snubbers 30 and 31 are fastened to ropes 34 and 35 and thence to posts or other fastenings on the wharf. Thrust rod 17 has a rubber suction cup 36 mounted on the boat end of said rod and against the hull 10. The advantage of this arrangement is that its use is more flexible, it can be used almost anywhere without a special hull fixture, and it can be folded up, wrapped around with its ropes, and stowed aboard in a small space.

As can be seen from the drawings, each of the foregoing embodiments of my invention permits the angle of the thrust rod relative to the hull of the vessel and the angle of the thrust rod relative to the wharf to vary with motion of the vessel in the water without impairing the operation of the invention in fending the vessel away from the wharf.

Accordingly, while the invention has been described with particular reference to specific embodiments thereof in the interest of complete definiteness it will be understood that it may be embodied in a variety of forms diverse from those shown and described without departing from the spirit and scope of the invention as defined by the following claims.

I claim:

1. A fender for maintaining separation between a vessel and a wharf to which the vessel is moored, to prevent damage caused by movement of the vessel against the wharf, wherein the wharf's top surface is a relatively constant distance above water level, such fender comprising:
- a thrust rod having two ends, hereinafter called a "wharf end" and a "vessel end";
- first means, for connecting the vessel end of the thrust rod to the hull of the vessel;
- an elastic shock absorber element, one end of which is linked proximately to the wharf end of the thrust rod, and the other end of which is capable of being affixed to the wharf in such a way that translation of the wharf end of the thrust rod with respect to the wharf surface, such translation caused by movement of the vessel in the water, is opposed by forces exerted by the shock absorber element; and
- second means, affixed proximately to the wharf end of the thrust rod, for reducing friction, between the wharf and the wharf end of the thrust rod, such friction experienced in the course of translation of the wharf end of the thrust rod with respect to the wharf surface, said second means, when in normal use, being in contact with the wharf surface.

2. The fender of claim 1, wherein the second means includes at least one rolling member, the rolling axis of which is transverse to the thrust rod, such member capable of rotating an unlimited number of degress in either direction about the rolling axis.

3. The fender of claim 2, wherein the second means further includes an axle mounted on and transverse to the thrust rod in such a way that a hypothetical plane, in which lies the longitudinal axis of the thrust rod, is also perpendicular to the axle and divides the length of the axle into two approximately equal parts; and a pair of wheels, each wheel being mounted on one of these two parts of the axle.

4. The fender of claim 1, further comprising:
- a second elastic shock absorber element, one end of which is linked proximately to the wharf end of the thrust rod and the other end of which is capable of being affixed to the wharf.

5. The fender of claim 4, further comprising:
- a yoke assembly having (a) a stem, to which is affixed the wharf end of the thrust rod, and (b) two arms, there being attached to each arm one end of one of the two elastic shock absorber elements, the other end of each of such shock absorber elements being capable of being affixed to the wharf; and
- a roller, mounted between the arms of the yoke assembly.

6. The fender of claim 5, wherein the yoke assembly is detachably affixed to the wharf end of the thrust rod.

7. The fender of claim 4, wherein each elastic shock absorber element has one end so linked to the thrust rod as to enable, when the other end of such element is properly affixed to the wharf, (i) a line passing through the ends of such element to be in a direction generally transverse to the thrust rod and (ii) the two elements to be oriented in a fashion having approximate bilateral symmetry about an axis through which the thrust rod passes.

8. The fender of claim 7, wherein the second means includes at least one rolling member, the rolling axis of which is transverse to the thrust rod, such member capable of rotating an unlimited number of degrees in either direction about the rolling axis.

9. The fender of claim 7, wherein the first means includes:
- (a) a hull fitting, for mounting on the hull of a vessel, and in which there has been formed a socket for receiving the vessel end of the thrust rod; and
- (b) an elastic loop, attached to both the hull fitting and the vessel end of the thrust rod, at least one attachment thereof being removable, so as removably to retain the vessel end of the thrust rod in the socket.

10. The fender of claim 9, further comprising:
- a yoke assembly having (a) a stem to which is affixed the wharf end of the thrust rod, and (b) two arms, there being attached to each arm one end of one of the two elastic shock absorber elements, the other end of each of such shock absorber elements being capable of being affixed to the wharf; and
- a roller, mounted between the arms of the yoke assembly.

11. The fender of claim 4, wherein the first-mentioned shock absorber element and the second shock absorber element together include a single prolongated span of elastic material, having two ends, each end being capable of being affixed to the wharf, and, further, having a hole formed in a region, between the two ends, for linking the material to the thrust rod.

12. The fender of claim 9, wherein the first-mentioned shock absorber element is a snubber and the second shock absorber element is also a snubber.

13. The fender of claim 1, wherein the first means includes a hull fitting, for mounting on the hull of a vessel, and in which there has been formed a socket for receiving the vessel end of the thrust rod.

14. The fender of claim 13, wherein the first means includes an elastic loop, attached to both the hull fitting and the vessel end of the thrust rod, at least one attachment thereof being removable, so as removably to retain the vessel end of the thrust rod in the socket.

15. The fender of claim 1, wherein the first means includes a suction cup, affixed to the vessel end of the thrust rod, for keeping the thrust rod in contact with the hull of the vessel.

* * * * *